US008643597B2

(12) United States Patent
Jang et al.

(10) Patent No.: US 8,643,597 B2
(45) Date of Patent: Feb. 4, 2014

(54) DISPLAY APPARATUS, CONTROL METHOD THEREOF, AND DISPLAY SYSTEM WITH AUTOMATIC IMAGE ORIENTATION ADJUSTMENT

(75) Inventors: Mi-sook Jang, Suwon-si (KR); Geun-sam Yang, Suwon-si (KR); Yun-ju Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1054 days.

(21) Appl. No.: 11/246,125

(22) Filed: Oct. 11, 2005

(65) Prior Publication Data

US 2006/0104016 A1    May 18, 2006

(30) Foreign Application Priority Data

Nov. 15, 2004 (KR) .......................... 10-2004-0093258

(51) Int. Cl.
*G06F 3/033* (2013.01)
(52) U.S. Cl.
USPC ............................ 345/158; 345/204; 345/649
(58) Field of Classification Search
USPC ......... 345/158, 659, 204, 649; 455/90.3–566; 710/45
See application file for complete search history.

(56) References Cited

U.S. PATENT DOCUMENTS

| 4,831,368 | A | 5/1989 | Masimo et al. |
| 5,329,289 | A | 7/1994 | Sakamoto et al. |
| 5,774,233 | A | 6/1998 | Sakamoto |
| 6,115,025 | A | 9/2000 | Buxton et al. |
| 6,226,016 | B1 | 5/2001 | Chee et al. |
| 6,765,577 | B1 | 7/2004 | Tang et al. |
| 6,850,247 | B1 * | 2/2005 | Reid et al. ..................... 345/611 |
| 6,952,601 | B2 * | 10/2005 | Lieu et al. .................. 455/575.1 |
| 7,081,902 | B1 * | 7/2006 | Crow et al. ................... 345/611 |
| 7,170,534 | B2 | 1/2007 | Son et al. |
| 7,598,948 | B1 * | 10/2009 | Priem ........................... 345/204 |
| 2003/0001829 | A1 * | 1/2003 | Tanizoe et al. ................ 345/204 |
| 2003/0085870 | A1 * | 5/2003 | Hinckley ...................... 345/156 |

(Continued)

FOREIGN PATENT DOCUMENTS

| CN | 1385824 | 12/2002 |
| DE | 20118670 | 2/2002 |

(Continued)

OTHER PUBLICATIONS

PCT Search Report dated Jan. 10, 2006 issued in PCT/KR2005/003250.

(Continued)

*Primary Examiner* — Amare Mengistu
*Assistant Examiner* — Vinh Lam
(74) *Attorney, Agent, or Firm* — Stanzione & Kim, LLP

(57) ABSTRACT

A display apparatus including a communication port to communicate with an external source, an on screen display (OSD) generator to generate an OSD menu, and a display panel to display the OSD menu thereon, the display apparatus further including a pivot sensor to sense a pivoting angle of the display panel, and output data corresponding to the pivoting angle when the display panel is pivoted, and a controller to set an OSD displaying direction of the OSD generator according to the data about the pivoting angle from the pivot sensor, and transmit the data relating to the pivoting angle to the external source through the communication port.

20 Claims, 2 Drawing Sheets

(56) References Cited

U.S. PATENT DOCUMENTS

| | | | |
|---|---|---|---|
| 2003/0117418 A1* | 6/2003 | Poynter | 345/619 |
| 2003/0122781 A1* | 7/2003 | Koo | 345/158 |
| 2003/0157971 A1* | 8/2003 | Lieu et al. | 455/566 |
| 2004/0164958 A1* | 8/2004 | Park | 345/158 |
| 2004/0164974 A1* | 8/2004 | Son et al. | 345/204 |
| 2005/0068304 A1* | 3/2005 | Lewis et al. | 345/168 |
| 2005/0104848 A1* | 5/2005 | Yamaguchi et al. | 345/156 |
| 2006/0033760 A1* | 2/2006 | Koh | 345/649 |
| 2006/0146009 A1* | 7/2006 | Syrbe et al. | 345/156 |

FOREIGN PATENT DOCUMENTS

| | | |
|---|---|---|
| JP | 06-236248 | 8/1994 |
| JP | 2001-75546 | 3/2001 |
| KR | 1020010073842 | 8/2001 |
| KR | 2001-97994 | 11/2001 |
| KR | 2001-0097994 | 11/2001 |
| KR | 2002-4390 | 1/2002 |
| KR | 2002-0037157 | 5/2002 |
| KR | 2003-714 | 1/2003 |
| KR | 20030001729 | 1/2003 |
| KR | 2003-0080131 | 10/2003 |
| KR | 2003-80131 | 10/2003 |
| KR | 2004-78947 | 9/2004 |
| KR | 2005-41151 | 5/2005 |

OTHER PUBLICATIONS

Chinese Office action dated Jun. 27, 2008 issued in CN 2005800390209.
European Search Report issued Oct. 30, 2009 in EP Application No. 05792737.8.
Korean Office Action issued Mar. 28, 2011 in KR Application No. 10-2004-0093258.
KR Office Action issued Oct. 21, 2011 in KR Patent Application No. 10-2004-0093258.
EP Oral Proceedings issued Nov. 2, 2011 in EP Application No. 05 792 737.8.
Chinese Decision issued on May 8, 2009 in CN Patent Application No. 2005800390209.
Chinese Reexamination Notification issued on Mar. 23, 2010 in CN Patent Application No. 200580039020.9.
PCT International Preliminary Report issued on Feb. 27, 2007 in PCT Application No. PCT/KR2005/003250.
European Notice of Allowance Issued on Oct. 12, 2012 in EP Patent Application No. 05792737.8.

* cited by examiner

DISPLAY APPARATUS, CONTROL METHOD THEREOF, AND DISPLAY SYSTEM WITH AUTOMATIC IMAGE ORIENTATION ADJUSTMENT

CROSS-REFERENCE TO RELATED APPLICATIONS

This application claims the benefit of Korean Patent Application No. 10-2004-0093258, filed on Nov. 15, 2004, which is hereby incorporated by reference for all purposes as if fully set forth herein.

BACKGROUND OF THE INVENTION

1. Field of the Invention

The present invention relates to a display apparatus, a control method thereof, and a display system, and more particularly, to a display apparatus having a pivoting function, a control method thereof, and a display system.

2. Description of the Related Art

A conventional display apparatus processes a video signal transmitted, which has a predetermined format, from an internal or external source, thereby displaying an image.

The display apparatus may be a liquid crystal display (LCD), a plasma display panel (PDP), an organic electroluminescent display (OLED), etc., having a pivotable display panel. Thus, the display panel may be rotated with respect to a perpendicular axis to its surface so as to arrange in a landscape or portrait direction, which is referred to as a pivot function.

To use the pivot function, a computer should include a video card capable of supporting the pivot function and/or have a software program supporting a pivot function.

In the conventional display apparatus having the pivot function, a user pivots the display panel on a perpendicular axis to its surface, and then selects a pivoting angle through an input unit, such as a keyboard or the like. Thus, the computer processes an input video signal corresponding with the pivoting function selected by a user, and transmits the processed video signal to the display apparatus.

The display apparatus processes the received video signal through a scaler or the like, and displays an image according to the video signal. Meanwhile, an on screen display (OSD) menu provided in the display apparatus is also rotated by a pivoting command transmitted from the computer.

However, in the conventional display apparatus with the pivoting function, a user should separately rotate the display panel at a predetermined angle in order to use the pivoting function and select the pivoting angle in detail through a predetermined input unit, which makes the pivoting function time-consuming and difficult to use.

SUMMARY OF THE INVENTION

An aspect of the present invention is to provide a display apparatus having a is pivoting function, a control method thereof and a display system, in which a pivoting angle of a display panel is automatically sensed, an OSD menu is automatically rotated on the basis of the pivoting angle, and corresponding data is output to an external source, thereby fulfilling the pivoting function.

Additional features of the invention will be set forth in the description which follows, and in part will be apparent from the description, or may be learned by practice of the invention.

The invention provides a display apparatus including a communication port communicating with an external source, an on screen display generator generating an on screen display menu, a display panel displaying the on screen display menu thereon, the display apparatus further including a pivot sensor sensing a pivoting angle of the display panel and outputting data corresponding to the pivoting angle when the display panel is pivoted, and a controller setting an on screen display displaying direction of the on screen display generator according to the data relating to the pivoting angle from the pivot sensor and transmitting the data relating to the pivoting angle to the external source through the communication port.

The invention further provides a display system including an external source processing a video signal, a display apparatus having a pivoting function, including a communication port communicating with the external source, an on screen display generator generating an on screen display menu, a display panel displaying the on screen display menu thereon, a memory storing data relating to a pivoting angle of the display panel, a pivot sensor sensing the pivoting angle of the display panel and outputting data corresponding to the pivoting angle when the display panel is pivoted by a user, and a controller comparing the data relating to the pivoting angle sensed by the pivot sensor with the data relating to the pivoting angle stored in the memory, setting an on screen display displaying direction of the on screen display generator on the basis of the data relating to the pivoting angle from the pivot sensor when the data relating to the pivoting angle sensed by the pivot sensor is not equal to the data relating to the pivoting angle stored in the memory, and transmitting the data relating to the pivoting angle to the external source through the communication port, wherein the external source processes the video signal according to the data relating to the pivoting angle received through the communication port and transmits the processed video signal to the display apparatus.

The invention further provides for a method of controlling a display apparatus including a communication port communicating with an external source, an on screen display generator generating an on screen display menu, and a display panel displaying the on screen display menu thereon, the method including storing data relating to a pivoting angle of the display panel, sensing the pivoting angle of the display panel and outputting data relating to the sensed pivoting angle, comparing the sensed data relating to the pivoting angle with the stored data relating to the pivoting angle, and setting an on screen display displaying a direction of the on screen display generator according to the sensed data relating to the pivoting angle when the output data relating to the pivoting angle is not equal to the stored data relating to the pivoting angle, and transmitting the data relating to the pivoting angle to the external source through the communication port.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENT

Figure 1:
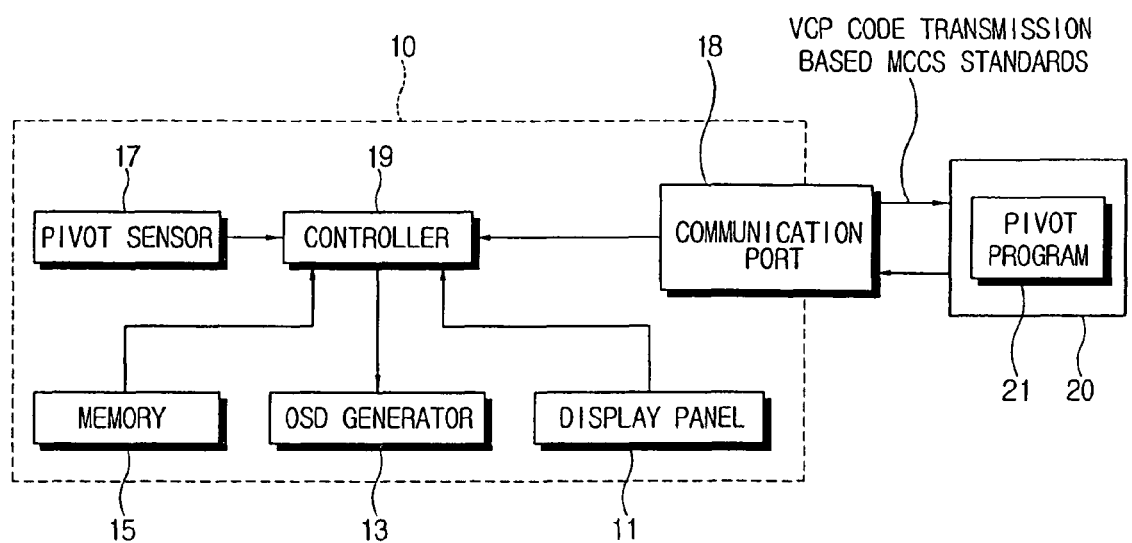
FIG. 1 is a control block diagram of a display system comprising a display apparatus according to an embodiment of the invention.

Reference will now be made in detail to the embodiments of the present invention, examples of which are illustrated in the accompanying drawings, wherein like reference numerals refer to like elements throughout. The embodiments of a display system comprising a display apparatus 10 and a computer 20 are described below in order to explain the present invention by referring to the figures.

FIG. 1 is a control block diagram of a display apparatus according to an embodiment of the invention.

Referring to FIG. 1, there is provided a display apparatus 10 that includes a display panel 11 to display an image according to a processed video signal, an OSD generator 13 to generate an OSD menu, a pivot sensor 17 to sense a pivoting angle of the display panel 111 and output a corresponding signal, a communication port 18 to communicate with an external source, and a controller 19 to control the display apparatus 10. The display apparatus 10 may further include a memory 15 to store data relating to the pivoting angle of the display panel 11.

The display panel 11 processes a video signal received through an internal source or an external source, and displays an image thereon. Here, the display panel 11 may be realized by an LCD, a PDP, or etc.

Further, the display panel 11 has a pivotable structure, e.g., rotatable, turnable, moveable, spinable, etc., and its pivoting angle is determined according to the pivotable structure.

The OSD generator 13 generates a video signal for the OSD menu for adjusting information relating to a video signal received from the external source and information relating to the display apparatus 10. The OSD generator 13 may be realized by an OSD integrated chip (IC).

The OSD menu generated by the OSD generator 13 and displayed on the display panel 11 includes various OSD items for adjusting information relating to an effective area position, color, etc. of the display apparatus 10 or information about the video signal.

The memory 15 may be realized by an erasable programmable read only memory (EPROM), an electrical erasable programmable read only memory (EEPROM), a register, or the like. Thus, data may be reread and rewritten from the memory 15.

The data relating to the pivoting angle of the display panel is stored in the memory 15 and may include at least one of −90 degrees, 90 degrees, and 180 degrees.

The pivot sensor 17 senses the pivoting angle of the display panel 11 and outputs sensed data to the controller 19. The pivot sensor 17 may be realized by a pivoting angle sensing IC.

The pivot sensor 17 may output signals having different electrical potential according to the pivoting angles. Further, the pivot sensor 17 outputs a corresponding signal when the pivoting angle is more or less than a predetermined reference angle, thereby preventing a sensitive operation. The pivot sensor 17 may be designed to only output a corresponding signal when the pivoting angle is more or less than a predetermined than the predetermined reference angle. In a non-limiting example, the pivot sensor 17 may not output the signal when the pivoting angle is within a range from 0 degree to 30 degrees.

An allowable pivoting angle of the display panel 11 may be divided into predetermined ranges, and the same signal may be output with regard to the pivoting angles corresponding to the same range. For example, the allowable pivoting angle may be divided into a range from −30 degrees to 30 degrees, a range from 50 degrees to 120 degrees, and a range from 150 degrees to 210 degrees, and the same signal is output with regard to the same range.

The communication port 18 enables the data to communicate with the external source and is connected with a communication cable, such as a digital video interface (DVI) connector, a high definition multimedia interface (HDMI) connector, etc.

The controller 19 checks the sensed signal output from the pivot sensor 17, sets an OSD pivoting angle as an OSD displaying direction arranging the OSD menu generated by the OSD generator 13, and transmits the corresponding signal to the external source through the communication port 18, wherein the controller 19 may be realized by a micro control unit (MCU).

The controller 19 may further include an OSD pivot program to pivot the OSD menu.

The controller 19 sets the OSD pivoting angle, and converts an OSD video signal output from the OSD generator 13 into a signal corresponding with the pivoted image by using a process or an equation that is different depending on the pivoting angles, thereby controlling the OSD menu on the display panel 11.

When the display panel 11 is pivoted from a pivoting angle having a range between 0 degree to 180 degrees, the respective video signals are reversed with respect to each other, such that the controller 19 reverses the video signal in order to display an image, and vice versa. Similarly, the controller 19 reverses the video signal when the display panel 11 is pivoted from a pivoting angle having a range of between −90 degrees to 90 degrees, and vice versa.

The controller 19 may further control the memory 15 to store the sensed signal of the pivot sensor 17 therein, and control the display panel 11 to display the OSD menu and an image according to the video signal output from the external source according to the pivoting angle data stored in the memory 15 when power is on.

According to an embodiment of the invention, a computer 20 may be used as the external source (refer to FIG. 1).

The computer 20 has a pivot program 21. The controller 19 outputs a signal relating to the pivoting angle as a virtual control panel (VCP) code command according to monitor control command set (MCCS) standards through the communication port 18.

Further, when the computer 20 requests the controller 19 to send the data relating to the pivoting angle of the display panel 11, the controller 19 reads the data from the memory 15 and then outputs the data as the VCP code based on the MCCS standards.

The pivot program 21 of the computer 20 recognizes the signal transmitted from the display apparatus 10 and transforms the video signal transmitted from the computer 20 to the display apparatus 10 in correspondence with the pivoting angle of the display panel 11, thereby rotating the image according to the video signal.

Therefore, even when a user does not know how to use the pivot program 21, the pivoting angle of the display panel 11 is automatically sensed when the display panel 11 is pivoted, so that an image according to the video signal from the external source as well as the OSD menu is properly displayed according to the pivoting angles.

Figure 2:
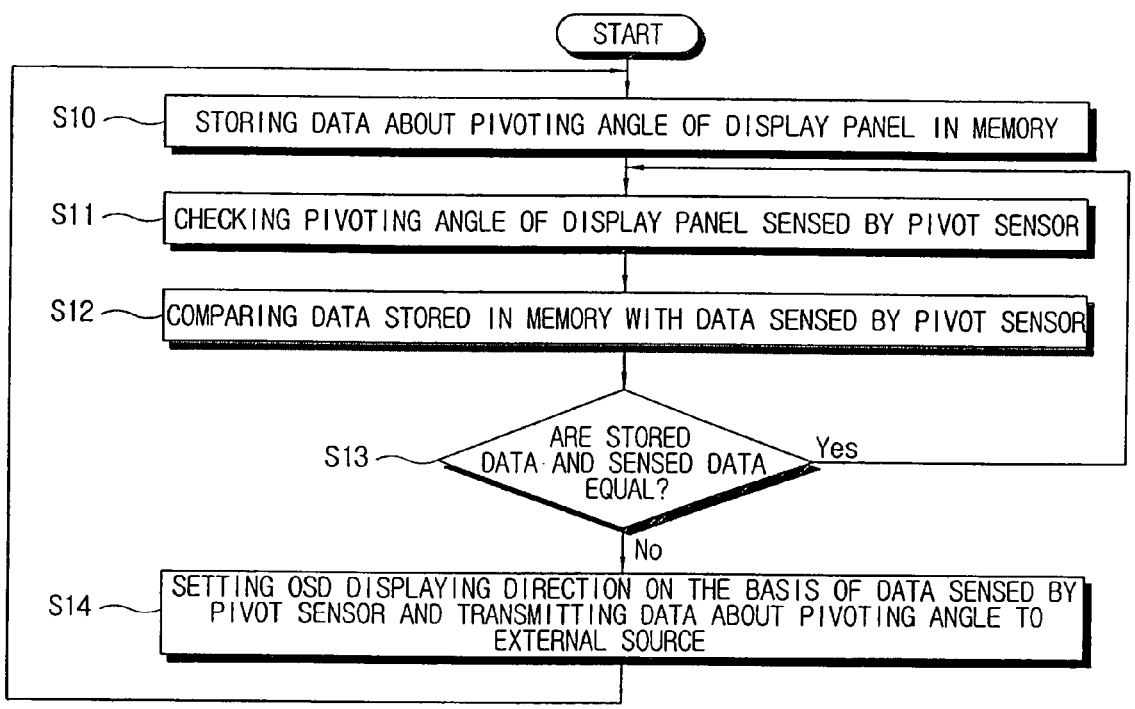
FIG. 2 is a control flowchart of a display apparatus according to another embodiment of the invention.

FIG. 2 is a control flowchart of a display apparatus according to another embodiment of the present invention. A display apparatus 10 according to the embodiment of the invention discussed below and described with reference to FIG. 2, has the same configuration as the configuration of the display apparatus of the embodiment of the invention discussed above and shown in FIG. 1, and thus repetitive descriptions are avoided as necessary.

Referring to FIG. 2, in a non-limiting embodiment of the invention, the controller 19 controls the memory 15 to store the data relating to the pivoting angle of the display panel 11 sensed by the pivot sensor 17, as shown at operation S10.

When the display apparatus 10 is turned on, the controller 19 controls the OSD menu to be generated according to the data relating to the pivoting angle stored in the memory 15, and transmits the data to the computer 20 by reading out the data from the memory 15 when the computer 20 requests the corresponding data.

The pivot sensor 17 senses whether the display panel 11 is pivoted, and outputs a signal corresponding to the pivoting angles. The controller 19 checks the signal corresponding to the pivoting angle, as shown at operation S11.

The controller 19 compares the data relating to the pivoting angle sensed by the pivot sensor 17 with the data relating to the pivoting angle stored in the memory 15, as shown at operation S13.

When the data of the pivot sensor 17 is not equal to the data of the memory 15, the OSD menu is rotated according to the data from the pivot sensor 17, and the data from the pivot sensor 17 is transmitted to the external source, as shown at operation S14.

Further, the data relating to the pivoting angle stored in the memory 15 is replaced by the data relating to the pivoting angle sensed by the pivot sensor 17, and then stored in the memory 15, as shown at operation S10.

The foregoing control flowchart of the controller 19 may vary according to its programming methods.

As described above, the present invention provides a display apparatus, a control method thereof and a display system, in which a pivoting angle of a display panel is automatically sensed, an OSD menu is automatically rotated according to the pivoting angle, and corresponding data is output to an external source, thereby completing the pivoting operation.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A display apparatus comprising:
a communication port communicating with an external source;
a generator to generate a first signal;
a display panel to receive the first signal from the generator, and to display the received first signal and a second signal as an image thereon, the first signal to adjust at least one of information relating to the second signal and information relating to the display apparatus, and the second signal being an image signal received from the external source through the communication port;
a pivot sensor to sense a pivoting angle of the display panel and to output data corresponding to the pivoting angle when the display panel is pivoted and when the pivoting angle is in a first predetermined range, and to not output the output data corresponding to the pivoting angle when the pivoting angle is in a second predetermined range; and
a controller to set a display displaying direction of the image of the first signal according to the data relating to the pivoting angle from the pivot sensor and to automatically transmit the data relating to the pivoting angle to the external source through the communication port when the display panel is rotated, and to control the display panel according to the first signal having the set displaying direction and the second signal pivoted by the external source based on the pivoting angle;
a memory to store the data relating to the pivoting angle of the display panel,
wherein the controller replaces the data relating to the pivoting angle stored in the memory with the data relating to the pivoting angle sensed by the pivot sensor when the data relating to the pivoting angle sensed by the pivot sensor is not equal to the data relating to the pivoting angle stored in the memory,
wherein the external source is located outside of the display apparatus and the generator, display panel, pivot sensor, and controller are enclosed within the display apparatus.

2. The display apparatus of claim 1, wherein the displaying direction comprises a −90 degree angle, and/or a 90 degree angle, and/or a 180degree angle.

3. The display apparatus of claim 1, wherein the controller transmits the data of the pivoting angle as a virtual control panel code based on monitor control command set standards to the external source through the communication port.

4. The display apparatus of claim 1, wherein the controller transmits the data of the pivoting angle to the external source through the communication port as a virtual control panel code based on monitor control command set standards.

5. The display apparatus of claim 2, wherein the controller transmits the data of the pivoting angle to the external source through the communication port as a virtual control panel code based on monitor control command set standards.

6. The display apparatus of claim 1, wherein the image of the first signal displayed on the display panel includes items to adjust information relating to effective area position, color, or information about the signal.

7. The display apparatus of claim 1, wherein the controller controls the display panel to display the image of the first signal according to the pivoting angle.

8. A display system comprising:
an external source to process a first signal;
a display apparatus having a pivoting function, comprising:
a communication port communicating with the external source,
a generator to generate a second signal which is to adjust at least one of information relating to the first signal and information relating to the display apparatus,
a display panel to receive the second signal from the generator and to display the received first signal and the second signal as an image thereon,
a memory to store data relating to a pivoting angle of the display panel,
a pivot sensor to sense the pivoting angle of the display panel and to output data corresponding to the pivoting angle when the display panel is pivoted by a user and when the pivoting angle is in a first predetermined range, and to not output the output data corresponding to the pivoting angle when the pivoting angle is in a second predetermined range, and a controller to compare the data relating to the pivoting angle sensed by the pivot sensor with the data relating to the pivoting angle stored in the memory, to set displaying direction of the image of the second signal according to the data relating to the pivoting angle from the pivot sensor when the data relating to the pivoting angle sensed by the pivot sensor is not equal to the data relating to the pivoting angle stored in the memory, to automatically transmit the data relating to the pivoting angle to the external source through the communication port when the display panel is rotated, and to control the display panel to display the video signal having the set displaying direction and the first signal pivoted by the external source based on the pivoting angle, wherein the external source is located outside of the display apparatus while the generator, display panel, pivot sensor, memory, and controller are enclosed within the display apparatus, and wherein the controller replaces the data relating to the pivoting angle stored in the memory with the data relating to the pivoting angle sensed by the pivot sensor when the data relating to the pivoting angle sensed by the pivot sensor is not equal to the data relating to the pivoting angle stored in the memory.

9. The display system of claim 8, wherein the controller transmits the data relating to the pivoting angle of the display panel stored in the memory to the external source through the communication port when the external source requests the data relating to the pivoting angle of the display panel.

10. The display system of claim 8, wherein the controller transmits the data relating to the pivoting angle to the external source through the communication port as a virtual control panel code according to monitor control command set standards, and wherein the external source includes a computer having a pivot program recognizing the virtual control panel code according to the monitor control command set standards.

11. The display system of claim 9, wherein the controller transmits the data about the pivoting angle to the external source through the communication port as a virtual control panel code according to monitor control command set standards, and wherein the external source includes a computer having a pivot program recognizing the virtual control panel code according to the monitor control command set standards.

12. The display system of claim 8, wherein the controller controls the display panel to display the image of the signal according to the pivoting angle.

13. A method of controlling a display apparatus comprising a communication port communicating with an external source, a generator to generate a first signal, and a display panel to receive the first signal from the generator and to display an image, the method comprising:

storing data relating to a pivoting angle of the display panel;

sensing the pivoting angle of the display panel and outputting sensed data relating to the sensed pivoting angle when the sensed pivoting angle is in a first predetermined range, and not outputting the sensed data when the sensed pivoting angle is in a second predetermined range;

comparing the sensed data relating to the pivoting angle with the stored data relating to the pivoting angle; and setting a displaying direction of the image of the first signal of the generator according to the sensed data relating to the pivoting angle when the output sensed data relating to the pivoting angle is not equal to the stored data relating to the pivoting angle, and automatically transmitting the output sensed data relating to the pivoting angle to the external source through the communication port when the display panel is rotated, displaying the first signal corresponding to the image having the set the display displaying direction and a second signal output from the external source according to the pivoting angle data, the first signal to adjust at least one of information relating to the second signal and information relating to the display apparatus, and the second signal being an image signal pivoted by the external source based on the pivoting angle, wherein the stored data relating to the pivoting angle is replaced with the sensed data relating to the pivoting angle when the sensed data relating to the pivoting angle is not equal to the stored data relating to the pivoting angle, and wherein the external source is located outside of the display apparatus while the generator and display panel are enclosed within the display apparatus.

14. The method of claim 13, wherein the displaying direction comprises a −90 degree angle, and/or a 90 degree angle, and/or a 180 degree angle.

15. The method of claim 13, wherein the data transmitted to the external source comprises a virtual control panel code according to monitor control command set standards.

16. The method of claim 14, wherein the data transmitted to the external source comprises a virtual control panel code according to monitor control command set standards.

17. The method of claim 13, wherein the image of the signal displayed on the display panel includes items to adjust information relating to effective area position, color, or information about the video signal.

18. The method of claim 13, further comprising displaying the image of the signal according to the pivoting angle.

19. A display apparatus comprising:

a communication port operable to receive a first signal from an external source;

a generator operable to generate a second signal to be displayed as an image to adjust settings of the display apparatus;

a display panel which is rotatable about an axis, operable to receive the second signal, to display the image of the second signal, and operable to display an image based on the first signal received from the external source;

a pivot sensor operable to sense a pivoting angle of the display panel and operable to output data corresponding to the pivoting angle when the pivoting angle is in a first predetermined range, and to not output the output data when the pivoting angle is a second predetermined range;

a controller operable to control the generator to rotate the image of the second signal displayed on the display panel based on the data corresponding to the pivoting angle when the pivoting angle is greater than a predetermined reference angle, to transmit to the external source the data corresponding to the pivoting angle, and operable to control the display panel to display the image based on the first signal received from the external source and pivoted by the external source based on the external source and the image of the second signal that is rotated;

a memory to store the data relating to the pivoting angle of the display panel, wherein the controller replaces the data relating to the pivoting angle stored in the memory with the data relating to the pivoting angle sensed by the pivot sensor when the data relating to the pivoting angle sensed by the pivot sensor is not equal to the data relating to the pivoting angle stored in the memory.

20. The display apparatus of claim 19, wherein the pivot sensor outputs the data corresponding to the pivoting angle if the display rotates about the axis.

* * * * *